United States Patent
Kiełczykowski et al.

(10) Patent No.: US 10,310,543 B2
(45) Date of Patent: Jun. 4, 2019

(54) ACTUATOR RELEASE MECHANISM

(71) Applicant: Hamilton Sundstrand Corporation, Charlotte, NC (US)

(72) Inventors: Przemysław Kiełczykowski, Wrocław (PL); Jakub Bobak, Legnica (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 51 days.

(21) Appl. No.: 15/473,901

(22) Filed: Mar. 30, 2017

(65) Prior Publication Data

US 2017/0371368 A1    Dec. 28, 2017

(30) Foreign Application Priority Data

Jun. 24, 2016   (EP) .................... 16461530

(51) Int. Cl.
*G05G 5/06* (2006.01)
*B64D 41/00* (2006.01)

(52) U.S. Cl.
CPC ............. *G05G 5/06* (2013.01); *B64D 41/007* (2013.01); *F05D 2220/34* (2013.01)

(58) Field of Classification Search
CPC .. G05G 5/04; G05G 5/05; G05G 5/06; G05G 5/08; B64D 41/007; F05D 2220/34
See application file for complete search history.

(56) References Cited

U.S. PATENT DOCUMENTS

| | | | |
|---|---|---|---|
| 1,631,066 A * | 5/1927 | Saget | B60T 7/105 74/535 |
| 2,821,602 A * | 1/1958 | Hordechuck | B60K 23/00 337/148 |
| 2,897,484 A * | 7/1959 | Vogel | G05B 5/01 235/61 R |
| 5,820,074 A | 10/1998 | Trommer et al. | |
| 6,186,047 B1 | 2/2001 | Baruffaldi | |
| 6,948,685 B2 * | 9/2005 | Hawthorne | E05B 47/0002 244/129.1 |
| 7,125,058 B2 * | 10/2006 | Hawthorne | E05B 47/0002 294/82.28 |
| 8,640,563 B2 | 2/2014 | Lang et al. | |
| 8,844,703 B2 * | 9/2014 | Jang | B60T 1/005 192/219.5 |
| 9,016,152 B2 | 4/2015 | Jones et al. | |
| 9,193,472 B2 | 11/2015 | Sasscer | |
| 9,328,822 B2 * | 5/2016 | Hill | F16H 63/3483 |
| 9,365,295 B2 * | 6/2016 | Sasscer | B64D 41/007 |
| 9,415,880 B2 * | 8/2016 | Russ | B64D 41/007 |
| 9,676,374 B2 * | 6/2017 | Scherer | B60T 1/005 |

(Continued)

FOREIGN PATENT DOCUMENTS

EP         2527664 A1        11/2012

OTHER PUBLICATIONS

Extended European Search Report for International Application No. 16461530.4, dated Jan. 3, 2017, 8 pages.

*Primary Examiner* — Adam D Rogers
(74) *Attorney, Agent, or Firm* — Cantor Colburn LLP

(57) ABSTRACT

An actuator release mechanism includes an axially moveable member biased in a first axial position by a bias spring and driven to a second axial position by an actuation means such as a solenoid arranged in substantially the same axis as the axially moveable member. The axially moveable member can be a piston.

10 Claims, 6 Drawing Sheets

(56) References Cited

U.S. PATENT DOCUMENTS

| | | | |
|---|---|---|---|
| 10,006,476 B2 * | 6/2018 | Bannon | F15B 15/1476 |
| 2005/0098400 A1 * | 5/2005 | Kleinert | F16H 63/3433 |
| | | | 188/300 |
| 2005/0103926 A1 | 5/2005 | Hawthorne | |
| 2013/0327207 A1 | 12/2013 | Sasscer et al. | |
| 2013/0330121 A1 | 12/2013 | Sasscer et al. | |
| 2015/0096437 A1 | 4/2015 | Russ | |
| 2015/0232195 A1 | 8/2015 | Bannon | |
| 2016/0046383 A1 | 2/2016 | Bannon | |
| 2017/0203853 A1 * | 7/2017 | Sobolak | B64D 41/007 |
| 2017/0314657 A1 * | 11/2017 | Sobolak | B64D 41/007 |
| 2018/0052484 A1 * | 2/2018 | Sobolak | G05G 5/08 |

* cited by examiner

ACTUATOR RELEASE MECHANISM

FOREIGN PRIORITY

This application claims priority to European Patent Application No. 16461530.4 filed Jun. 24, 2016, the entire contents of which is incorporated herein by reference.

TECHNICAL FIELD

The present disclosure relates to release and locking mechanisms for deployable components. The mechanism is particularly suitable as an unlocking or release mechanism for a ram air turbine (RAT) actuator but could also find application in other deployable or movable systems such as other actuators, valves, pumps and the like.

BACKGROUND

Many systems and mechanisms are known in which a component is movable between a closed or stowed position and an open or deployed position, and wherein a component should be locked in the desired position and unlocked to permit movement between the positions. Particular examples are valves or actuators, such as RAT actuators as described in more detail below.

Locking mechanisms are known to secure the actuator, valve etc. in a particular position, and unlocking mechanisms are known to release the locking mechanism and permit movement of the actuator/valve components to a different position, whereupon the actuator components can then also be locked in the second position by means of a locking mechanism. A locking mechanism for a RAT actuator is disclosed, for example, in US 2013/0327207.

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn, due to the airflow, and generates electrical and/or hydraulic power. The RAT is typically pivoted into position by means of an actuator, for example a hydraulic actuator. The actuator typically includes a lock bolt which extends to deploy the RAT. The actuator has a lock mechanism which prevents inadvertent movement of the lock bolt and, thus, inadvertent deployment of the RAT. The main locking mechanism typically comprises a spring loaded lock bolt which must be moved in an axial direction to unlock the actuator. Such an actuator is disclosed, for example, in US 2015/0232195. RAT actuators are also disclosed in U.S. Pat. Nos. 8,640,563, 9,193,472 and US 2015/0096437.

An unlocking mechanism is provided to permit the axial bolt movement. A conventional unlocking mechanism is shown, for example, in FIGS. 2A and 2B, comprising a linkage arrangement, one end of which is rotatably coupled to one end of the lock bolt and the other end of which is axially fixed and rotatably coupled to, for example, a mounting wall. A solenoid moves the link between a locked (FIG. 2A) and an unlocked (FIG. 2B) position. In the locked position, the linkage assembly pushes against the lock bolt against the force of the lock bolt spring to prevent axial movement of the lock bolt. When it is required to deploy the RAT, the lock bolt needs to be released for axial movement of the actuator. As seen in FIG. 2B, a pull force, greater than the spring force, is exerted on the linkage assembly by means of a solenoid, which moves the linkage assembly out of engagement with the lock bolt. This allows the lock bolt to move axially to initiate actuator unlocking to permit deployment. The solenoid must have sufficient force to displace the lock bolt against the force of the lock bolt spring and the linkages and joints require sufficient axial and radial space and may also be prone to wear or damage.

The size and weight of components is of particular concern in aircraft where there is a desire to use lighter and smaller components, whilst maintaining safety and reliability.

There is a desire, therefore, to provide a locking/unlocking mechanism for such systems to prevent/permit axial movement of a component such as a lock bolt, without the need for such large solenoids and a series of links and in a more compact arrangement.

SUMMARY

Disclosed is an actuator release mechanism comprising: a longitudinal member moveable along an axis between a lock position and a release position; bias means to bias the longitudinal member in one of the lock position and the release position; and actuation means arranged to cause the longitudinal member to move along the axis away from the one position and towards the other of the lock position and the release position.

In one embodiment the actuation means comprises a solenoid. In the embodiment described, this is a pull solenoid but embodiments can be envisaged using a push solenoid.

The bias means is preferably a spring and in the embodiment shown, this biases a piston or the like in the lock position. When the actuation means, e.g. a solenoid is energized, this pulls the piston or other longitudinal member against the spring bias.

The longitudinal member is preferably a piston.

In one aspect, the disclosure provides an actuator assembly comprising a lock bolt, and a release mechanism as defined above, moveable relative to the lock bolt to permit or prevent axial movement of the lock bolt.

BRIEF DESCRIPTION OF THE DRAWINGS

Preferred embodiments will now be described by way of example only and with reference to the accompanying drawings in which.

DETAILED DESCRIPTION

Figure 1:
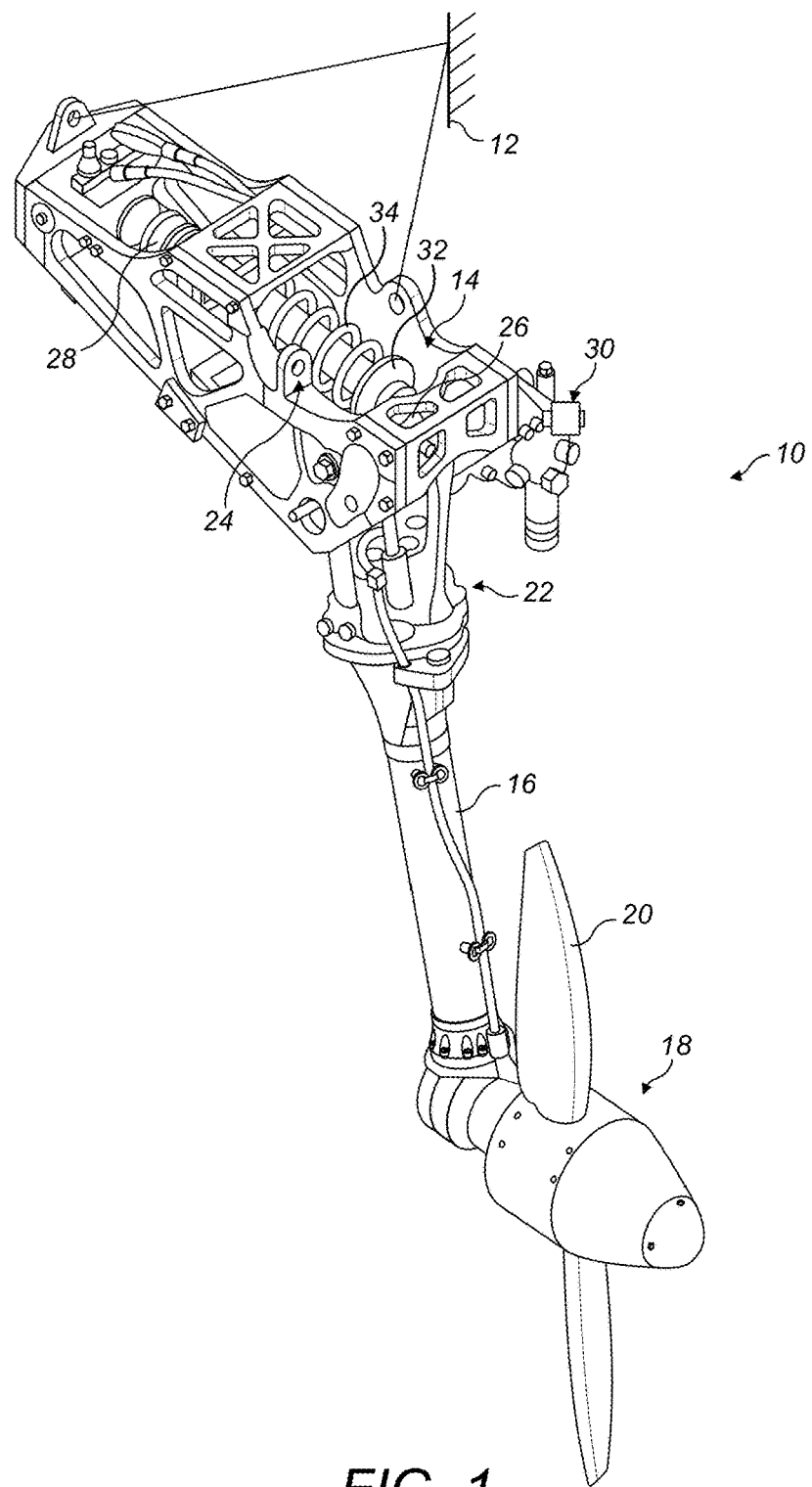
FIG. 1 shows a ram air turbine (RAT)

FIG. 1 shows a RAT system 10 which is secured to an aircraft structure 12 by housing 14. The housing 14 pivotally supports a strut 16 having a turbine 18 at one end. The turbine 18 includes blades 20 which impart rotational drive to a generator 22 and a hydraulic pump 30, for example. An actuator 24 is secured to the strut at a first end 26 and to the housing at a second end 28. The actuator 24 is illustrated in its deployed position. The actuator 24 comprises a cylinder 32 which is biased by a spring 34 in order to deploy the strut 16. When the cylinder 32 is retracted, it is held in its retracted position by means of a lock bolt of a locking mechanism, details of which will be described below.

The unlocking or release of the actuator is initiated by permitting movement of the lock bolt 38. This is made possible by means of a release mechanism according to the present disclosure which will be described further below.

Figure 2A:
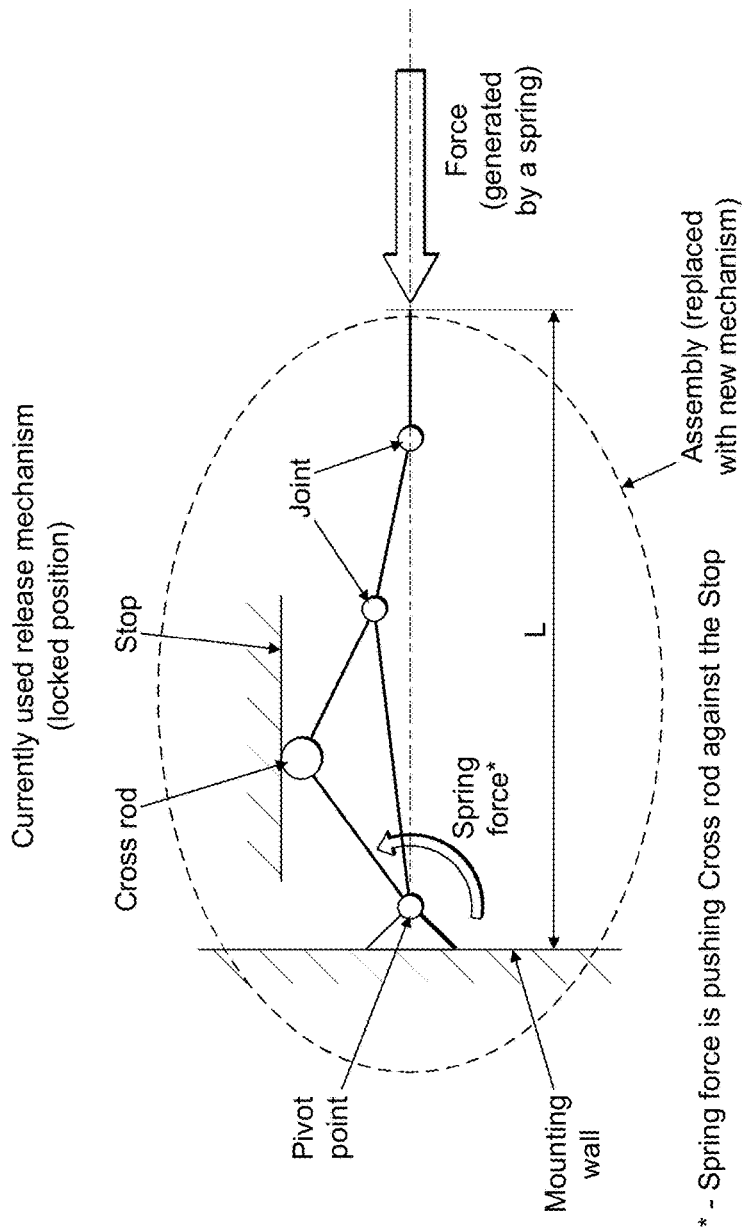
FIG. 2A shows a schematic view of a typical linkage release mechanism in the locked position.
Figure 2B:
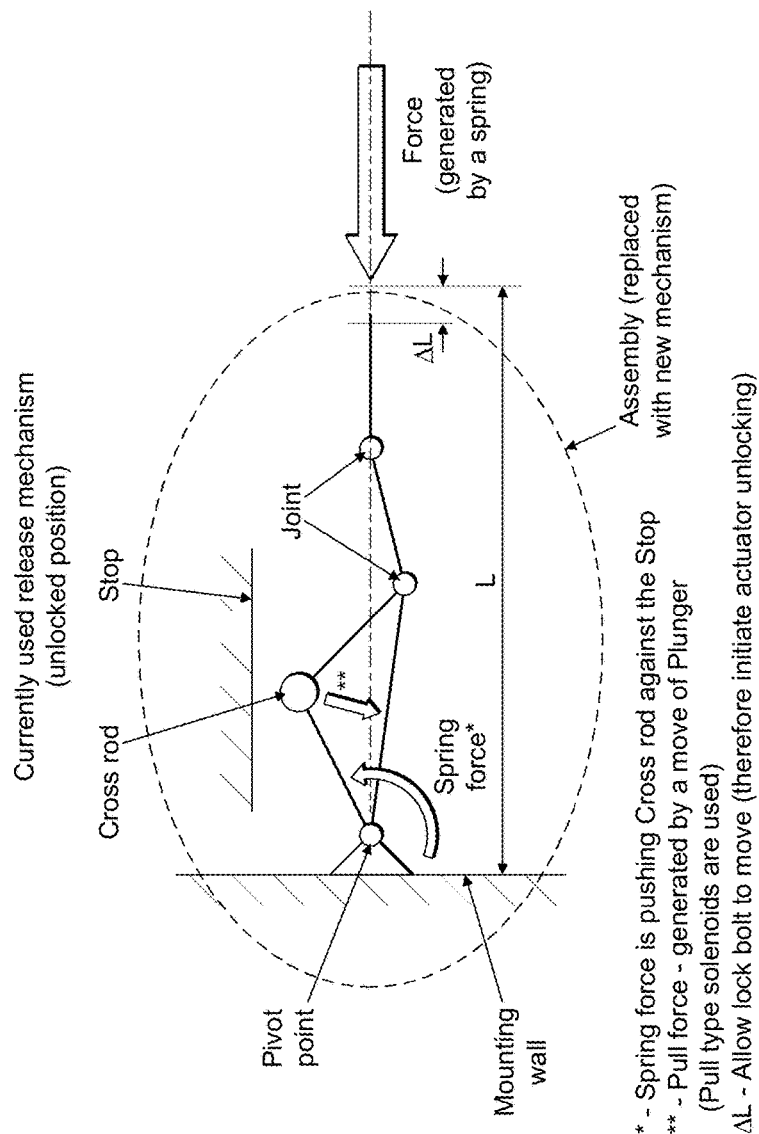
FIG. 2B shows the mechanism of FIG. 2A in the unlocked position.
Figure 3A:
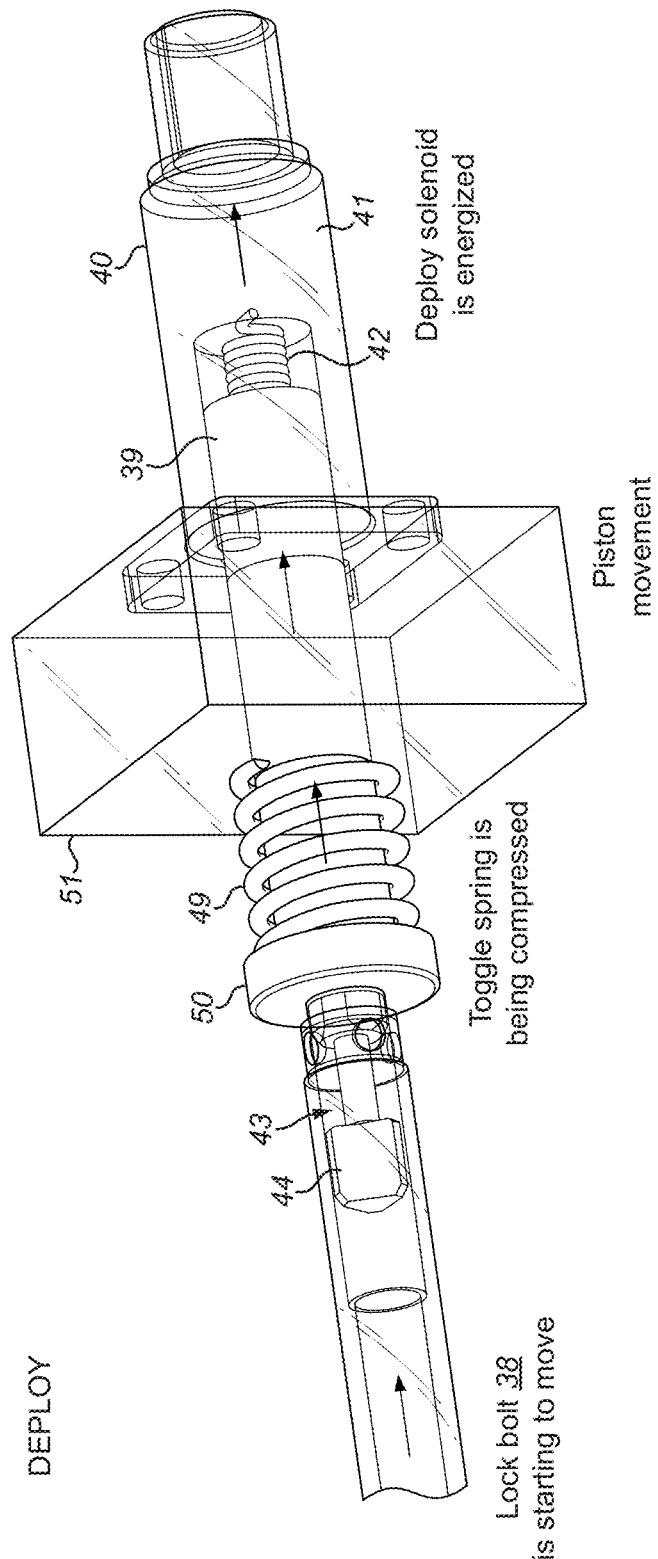
FIGS. 3A and 3B show a schematic view of the piston, cylinder and spring arrangement of the release mechanism, which would replace the conventional mechanism shown within the dashed lines of FIGS. 2A and 2B.
Figure 3B:
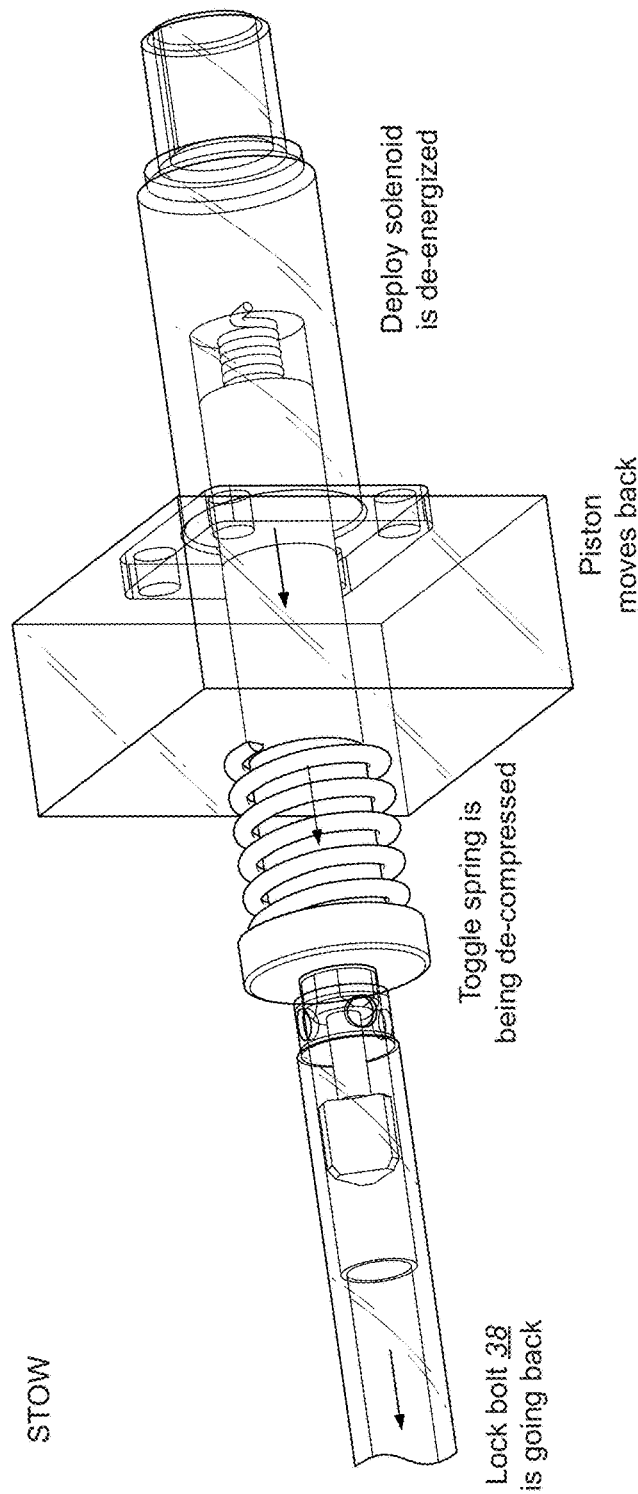

FIGS. 3A and 3B show a schematic view of the piston, cylinder and spring arrangement of the release mechanism which would replace the conventional, linkage-type mechanism shown within the dashed lines of FIGS. 2A and 2B.

FIG. 3A shows how the piston 39 and release mechanism respond when the actuator is to be deployed and, in FIG. 3B, when the actuator is to be stowed.

Figure 4:
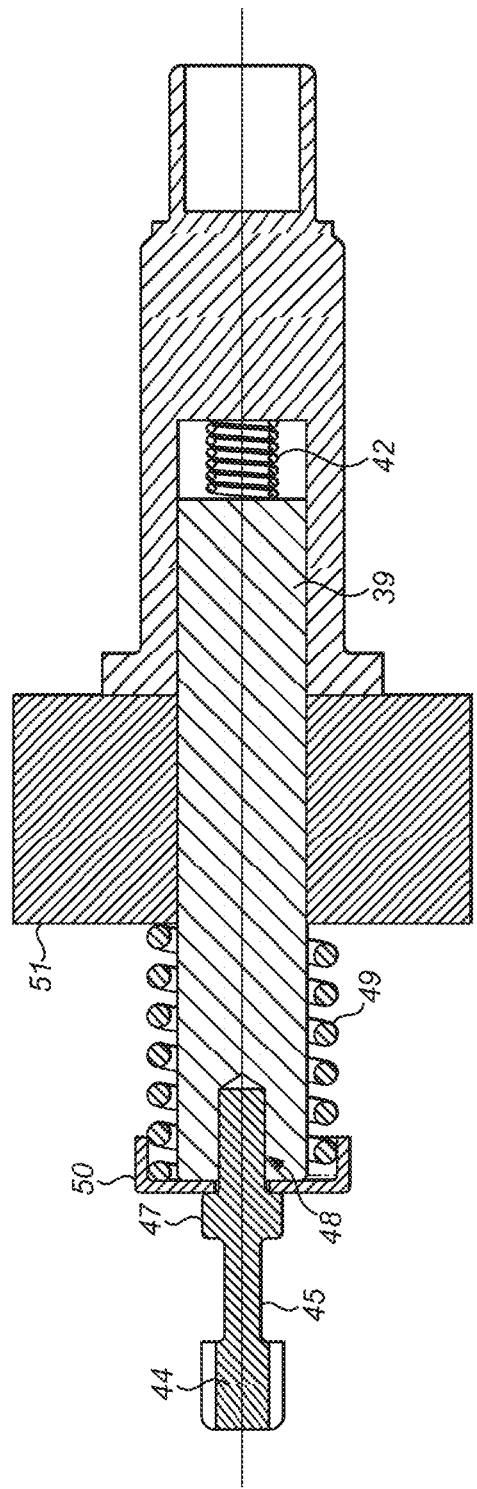
FIG. 4 shows the components of FIGS. 3A and 3B in a sectional view.

FIG. 4 shows the components of FIGS. 3A and 3B in a sectional view.

With reference to FIGS. 3A, 3B and 4, the preferred release mechanism comprises an essentially axial arrangement of a piston 39 axially moveable within a cylinder 40 and an actuation means for causing the axial movement of the piston 39. In the most preferred embodiment, the actuation means is a solenoid 41 working in cooperation with a solenoid spring 42 but other actuation means could be used.

In the embodiment shown, the solenoid 41 and solenoid spring 42 are arranged in the same axis as the piston 39 at one end of the piston.

The other end of the piston 39 has, mounted thereto, and axially moveable therewith, a toggle 43 or other means for abutment against or engagement with the lock bolt 38 of the actuator when the actuator is not deployed. Thus, in this position, the lock bolt 38 of the actuator has no space to move axially—i.e. axial movement, to enable deployment of the actuator, is blocked by the axial position of the piston.

It is only essential that some part of the release mechanism can block axial movement of the lock bolt when in the locked position.

The toggle shown in the drawings is only one example. This example will now be described in more detail. The toggle shown includes a toggle head 44 at the end that abuts against the lock bolt, and from which extends a toggle shaft 45 ending in a threaded portion 46. A toggle grip 47 may also be provided along the toggle shaft 45 to simplifying fastening the toggle to the piston 39. The piston 38 is provided with a threaded passage 48 into which the threaded portion of the toggle shaft is screwed to secure the toggle to the piston.

A bias means 49, which most preferably is a spring, referred to hereafter as the toggle spring 49 is also mounted over the end of and attached to the piston to which the toggle is attached and is preferably held in place by a cap 50.

In use, the release mechanism will extend through a wall 51 of an actuator housing or will extend through or be provided with an abutment surface for the other end of the toggle spring or bias means 49.

When the actuation means 41 is not activated or energized, the bias means or toggle spring 49 will be in its relaxed state to bias the piston 39 and hence the toggle 44 towards the lock bolt 38 of the actuator thus preventing axial movement of the lock bolt 38.

To deploy the actuator, the lock bolt 38 must be able to move axially—usually a short distance of around 9 mm. To allow this, some axial space must be provided between the toggle/piston and the lock bolt which means that the piston will need to be moved axially away from the lock bolt.

In the present mechanism, this is done by activating or energizing the actuation means e.g. the solenoid 41. This pulls the piston 39 away from the lock bolt 38. During deployment of the actuator, the solenoid 41 remains energized to hold the piston in the retracted, release position, counteracting the bias force of the toggle spring. The lock bolt 38 is then able to move under the force of a lock bolt spring mechanism. When the lock bolt has reached its deployment position, the actuator deployment mechanism which, in the case of a RAT, for example, comprises rollers and unlock pawls, can operate to deploy the actuator.

Whilst the objectives of the present release mechanism are achieved with the mechanism described above, the system is improved by incorporation of the bias means or toggle spring 49 shown in the drawings. As the solenoid 41 pulls the piston 39 back, the solenoid spring 42, but also the toggle spring 49 are compressed. The toggle spring is compressed between the cap 50, which moves with the piston 39, and the wall or surface 51. The toggle spring thus stores energy for the return movement when the solenoid is de-energized.

When the actuator is no longer to be deployed, it is stowed. To stow the actuator, the solenoid 41 is de-energized. This then allows the toggle spring 49 to expand against the wall 51 thus pushing the cap 50 and, hence the piston 39 and toggle 44 back towards the lock bolt 38. The toggle pushes the lock bolt back, causing compression of the lock bolt spring and engagement of the rollers/pawls etc. to lock the actuator.

An alternative embodiment could conceivably have a push-type solenoid, rather than a pull-type solenoid and a bias means that is in the biasing state when expanded rather than compressed, in which case the piston would be in the locked position when the solenoid was energized and in the unlocked/release position when the solenoid was de-energized.

The arrangement of the present release mechanism requires significantly fewer component parts as compared to the linkage system of the prior art, which, in turn, reduces the manufacturing, assembly and testing costs and avoids the need for shims as in the prior art systems. This can result in a more reliable and smaller deployment system. The axial construction is simple and compact and the mechanism does not rely on the use of cross rods etc. as in existing mechanisms.

This mechanism could be easily adapted to existing actuators.

The above is a description of a single embodiment by way of example only. Modifications may be made without departing from the scope of this disclosure.

While the apparatus has been described in the context of unlocking a RAT actuator, it may, as mentioned above, find use in other applications, for example of the types of actuator, valves, pumps or the like.

The invention claimed is:

1. A ram air turbine (RAT) actuator release mechanism comprising:
   a longitudinal member moveable along an axis between a lock position and a release position;
   bias means to bias the longitudinal member in one of the lock position and the release position; and
   actuation means arranged to cause the longitudinal member to move along the axis away from the one position and towards the other of the lock position and the release position;
   wherein the bias means is a toggle spring that, when the actuation means are not activated, is in a relaxed state that biases the longitudinal member towards a lock bolt to prevent movement of the actuation means.

2. An actuator release mechanism as claimed claim 1, wherein the longitudinal member comprises a piston.

3. An actuator release mechanism as claimed in claim 1, wherein the actuation means comprises a solenoid.

4. An actuator release mechanism as claimed claim 3, wherein the longitudinal member comprises a piston.

5. An actuator release mechanism as claimed in claim 3, wherein the solenoid is a pull-type solenoid.

6. An actuator release mechanism as claimed claim 5, wherein the longitudinal member comprises a piston.

7. A ram air turbine (RAT) actuator assembly comprising:
a lock bolt; and
an actuator release mechanism moveable relative to the lock bolt to permit or prevent axial movement of the lock bolt, the actuator release mechanism comprising:
a longitudinal member moveable along an axis between a lock position and a release position;
bias means to bias the longitudinal member in one of the lock position and the release position; and
actuation means arranged to cause the longitudinal member to move along the axis away from the one position and towards the other of the lock position and the release position;
wherein the bias means is a toggle spring that, when the actuation means are not activated, is in a relaxed state that biases the longitudinal member towards the lock bolt to prevent movement of the actuation means.

8. The assembly of claim 7, wherein the actuation means comprises a solenoid.

9. An assembly as claimed in claim 8, wherein the solenoid is a pull-type solenoid.

10. An assembly as claimed in claim 7, wherein the actuation means comprises a spring.

* * * * *